United States Patent
Banerjee et al.

(10) Patent No.: US 10,719,970 B2
(45) Date of Patent: Jul. 21, 2020

(54) LOW LATENCY FIRMWARE COMMAND SELECTION USING A DIRECTED ACYCLIC GRAPH

(71) Applicant: Apple Inc., Cupertino, CA (US)

(72) Inventors: Kutty Banerjee, San Jose, CA (US); Rohan Sanjeev Patil, San Francisco, CA (US); Pratik Chandresh Shah, Santa Clara, CA (US); Gokhan Avkarogullari, San Jose, CA (US); Tatsuya Iwamoto, Foster City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/864,833

(22) Filed: Jan. 8, 2018

(65) Prior Publication Data
US 2019/0213776 A1    Jul. 11, 2019

(51) Int. Cl.
  *G06T 15/00* (2011.01)
  *G06T 15/80* (2011.01)
  *G06F 9/48* (2006.01)
  *G09G 5/00* (2006.01)

(52) U.S. Cl.
  CPC .......... *G06T 15/005* (2013.01); *G06F 9/4881* (2013.01); *G06T 15/80* (2013.01); *G09G 5/00* (2013.01)

(58) Field of Classification Search
  None
  See application file for complete search history.

(56) References Cited

U.S. PATENT DOCUMENTS

| | | | | |
|---|---|---|---|---|
| 10,241,799 B2* | 3/2019 | Bourd | ............... | G06F 9/3838 |
| 10,255,654 B2* | 4/2019 | Mrozek | ............... | G06F 9/5027 |
| 10,437,637 B1* | 10/2019 | Koneru | ............... | G06F 8/44 |
| 10,515,431 B2* | 12/2019 | Yang | ............... | G06T 1/60 |
| 10,521,874 B2* | 12/2019 | Rao | ............... | G06T 1/20 |
| 2009/0187887 A1* | 7/2009 | Richins | ............... | G06F 9/445 |
| | | | | 717/120 |
| 2012/0017069 A1* | 1/2012 | Bourd | ............... | G06F 9/3838 |
| | | | | 712/216 |

(Continued)

OTHER PUBLICATIONS

"Reducing GPU offload latency via fine-grained CPU-GPU synchronization", by D. Lustig & M. Martonosi, 2013 IEEE 19th International Symposium on High Performance Computer Architecture (HPCA), pp. 354-365, Feb. 1, 2013. (Year: 2013).*

(Continued)

*Primary Examiner* — James A Thompson
(74) *Attorney, Agent, or Firm* — Blank Rome LLP

(57) ABSTRACT

One disclosed embodiment includes a method of scheduling graphics commands for processing. A plurality of micro-commands is generated based on one or more graphics commands obtained from a central processing unit. The dependency between the one or more graphics commands is then determined and an execution graph is generated based on the determined dependency. Each micro-command in the execution graph is connected by an edge to the other micro-commands that it depends on. A wait count is defined for each micro-command of the execution graph, where the wait count indicates the number of micro-commands that the each particular micro-command depends on. One or more micro-commands with a wait count of zero are transmitted to a ready queue for processing.

23 Claims, 9 Drawing Sheets

(56) References Cited

U.S. PATENT DOCUMENTS

| | | | | |
|---|---|---|---|---|
| 2016/0093012 | A1* | 3/2016 | Rao | G06T 1/60 345/522 |
| 2017/0236246 | A1* | 8/2017 | Mrozek | G06F 9/5027 345/522 |
| 2017/0300361 | A1* | 10/2017 | Lanka | G06F 9/4881 |
| 2019/0066255 | A1* | 2/2019 | Nalluri | G06T 1/20 |
| 2019/0102859 | A1* | 4/2019 | Hux | G06T 1/20 |
| 2019/0138210 | A1* | 5/2019 | Lindholm | G06F 13/4018 |
| 2019/0180406 | A1* | 6/2019 | Yang | G06F 9/4893 |
| 2019/0213776 | A1* | 7/2019 | Banerjee | G06F 9/4881 |
| 2019/0332429 | A1* | 10/2019 | Koneru | G06F 8/44 |

OTHER PUBLICATIONS

"A novel graphics processor architecture based on partial stream rewriting", by Lars Middendorf & Christian Haubelt, 2013 Conference on Design and Architectures for Signal and Image Processing, pp. 38-45, Oct. 1, 2013. (Year: 2013).*

"WIREFRAME: Supporting Data-dependent Parallelism through Dependency Graph Execution in GPUs", by A. Abdolrashidi, D. Tripathy, M. Belviranli, L. Bhuyan & D. Wong, 2017 50th Annual IEEE/ACM International Symposium on Microarchitecture (MICRO), pp. 600-611, Oct. 1, 2017. (Year: 2017).*

"WIREFRAME: Supporting Data-dependent Parallelism through Dependency Graph Execution in GPUs", by A. Abdolrashidi, D. Tripathy, M. Belviranli, L.Bhuyan, and D. Wong, 50th Annual IEEE/ACM International Symposium on Microarchitecture (MICRO), pp . 600-611, Oct. 2017. (Year: 2017).*

"Orchestrating Multiple Data-Parallel Kernels on Multiple Devices", by Janghaeng Lee, Mehrzad Samadi, and Scott Mahlke, 2015 International Conference on Parallel Architecture and Compilation, pp. 355-366, Oct. 2015. (Year: 2015).*

* cited by examiner

LOW LATENCY FIRMWARE COMMAND SELECTION USING A DIRECTED ACYCLIC GRAPH

BACKGROUND

The disclosed material relates to the field of graphics processing. More specifically, but not by way of limitation, this disclosure relates to determining dependencies among graphics commands, then searching and selecting commands in an order that ensures a low latency in processing commands for execution on a graphics processing unit.

Computers and other computational devices typically have at least one programmable processing element that is generally known as a central processing unit (CPU). They frequently also have other programmable processors that are used for specialized processing of various types, such as graphic processing operations which are typically called graphic processing units (GPUs). GPUs generally comprise multiple cores, each designed for executing the same instruction on parallel data streams, making them more effective than general-purpose CPUs for algorithms in which processing of large blocks of data is done in parallel. In general, a CPU functions as the host and hands-off specialized tasks to the GPUs.

Graphics commands generated by the CPU are communicated to the GPU for execution. In order to expedite the execution time of the graphics commands, the idle time of the GPU hardware must be reduced by selecting a proper order of commands for processing. However, adopting a proper order for execution on the GPU is especially difficult when multiple graphics commands depend on each other. The GPU may be sitting idle for a significant time while the GPU firmware is determining the dependencies between commands and searching for the proper command to be submitted to the GPU for processing.

SUMMARY

One disclosed embodiment includes a method of scheduling graphics commands for processing. A plurality of micro-commands is generated based on one or more graphics commands obtained from a central processing unit. The dependency between the one or more graphics commands is determined and an execution graph is generated based on the determined dependencies. Each micro-command in the execution graph may be connected by an edge to another micro-command(s) that it depends on. A wait count can be defined for each micro-command of the execution graph, where the wait count indicates the number of micro-commands that each particular micro-command depends on. Finally, one or more micro-commands with a wait count of zero are transmitted to a ready queue for processing by the graphics processing unit.

DETAILED DESCRIPTION

Figure 1:
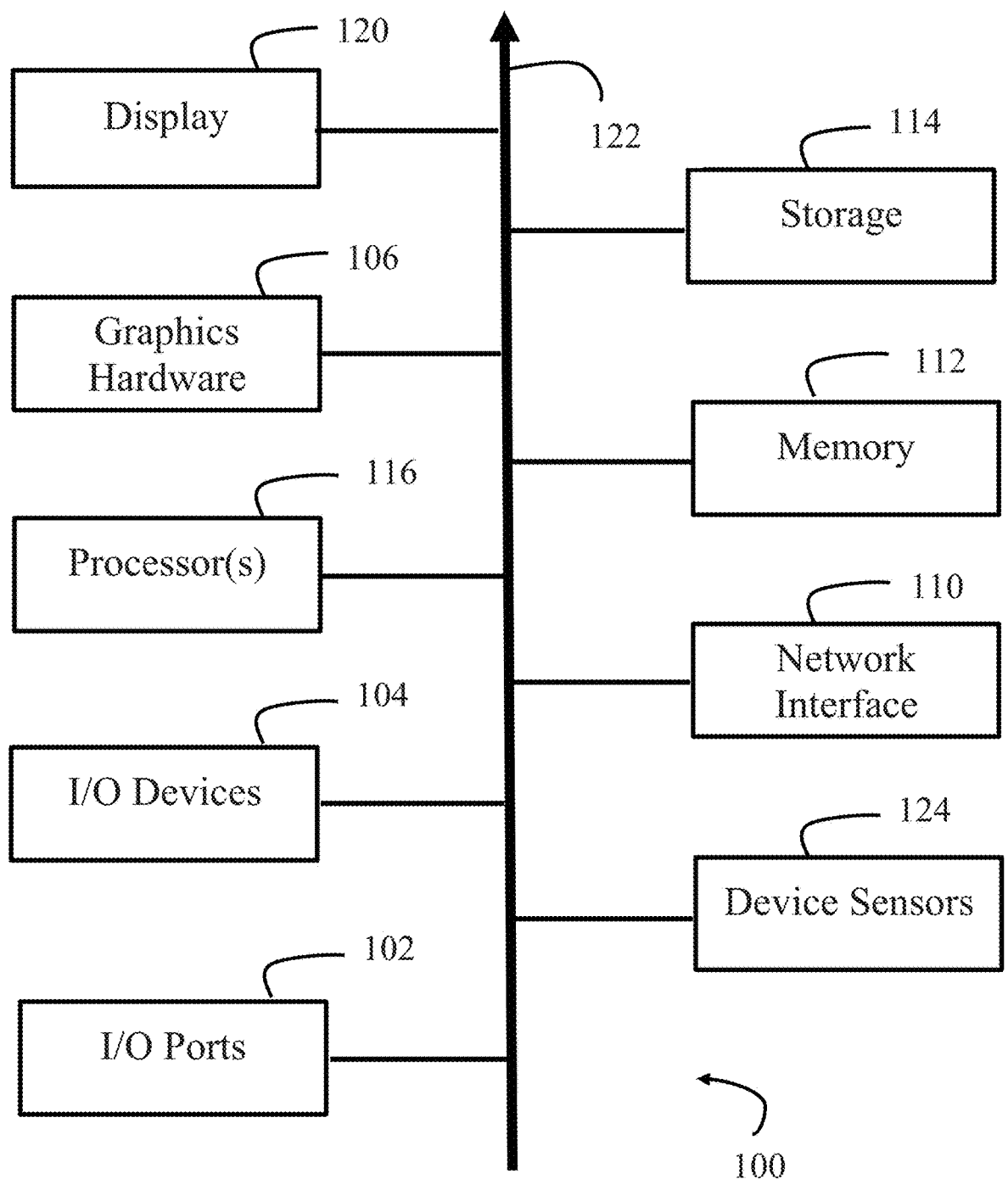
FIG. 1 is a block diagram illustrating a computer system that may be used, for example, as an end-user or developer computer system according to an embodiment of the disclosure.

The disclosed material relates to the field of graphics processing. More specifically, but not by way of limitation, this disclosure relates to determining dependencies among graphics commands and selecting commands in an order to ensure a low latency in processing and execution of the commands on a GPU. In an embodiment, one or more micro-operations may be generated based on one or more graphics command received from the CPU. The dependencies and priorities of the micro-operations can then be determined. In one or more embodiments, when the dependencies between a pair of micro-operations (i.e., a producer and a consumer) is known, the pair is added to an execution graph. Each micro-operation in the execution graph may be associated with a wait count, where the wait count is indicative of the number of parent micro-operations each particular micro-operation depends on. The micro-operations with a wait count of zero are transmitted to a ready queue for processing.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer system or a plurality of computer systems working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of systems having the benefit of this disclosure and being of ordinary skill in the design and implementation of computing systems and/or graphic systems.

Referring to FIG. 1, the disclosed embodiments may be performed by representative Computer System 100. For example the representative Computer System 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 1, Computer System 100, which is a form of a data processing system, includes Bus 122 which is coupled to Processor(s) 116, which may be CPUs and/or GPUs, Memory 112, which may include one or both of a volatile read/write random access memory (RAM) and a read-only memory (ROM), and non-volatile Storage Device 114. Processor(s) 116 may retrieve instructions from Memory 112 and Storage Device 114 and execute the instructions to perform operations described herein. Bus 122 interconnects these various components together and also interconnects Processor 116, Memory 112, and Storage Device 114 to Display Device 120, I/O ports 102 and peripheral devices such as input/output (I/O) devices 104 which may be pointing devices such as a mouse or stylus, keyboards, touch screens, modems, network interfaces, printers and other devices which are well known in the art. Typically, Input/output Devices 104 are coupled to the system through an input/output controller(s).

Computer System 100 may also have Device Sensors 124, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, Global Positioning Systems (GPS), microphones, CCDs (or other image sensors), infrared sensors, thermometers, etc. These and other sensors may work in combination with one or more GPUs, digital signal processors (DSPs), or conventional microprocessors along with appropriate programming so the sensor outputs may be properly interpreted and/or combined and interpreted.

Device Sensors 124 may capture contextual and/or environmental phenomena such as time; location information; the status of the device with respect to light, gravity, a magnetic field (e.g., a magnemometer); and even still and video images. In addition, network-accessible information, such as weather information, may also be used as part of the context. All captured contextual and environmental phenomena may be used to provide context to user activity or information about user activity. For example, in accessing a gesture or the expression or emotion of a user, the contextual information may be used as part of the contextual analysis. Computer System 100 may react to environmental and contextual actions and reflect a reaction in real-time on the display system through use of the Graphic Hardware 106.

Where volatile RAM is included in Memory 112, the RAM is typically implemented as dynamic RAM (DRAM), which requires continuous power in order to refresh or maintain the data in the memory. Graphic Hardware 106 may be special purpose computational hardware for processing graphic and/or assisting Processor 116 in performing computational tasks. In some embodiments, Graphic Hardware 106 may include CPU-integrated graphic and/or one or more programmable GPUs.

Storage Device 114 is typically a magnetic hard drive, an optical drive, a non-volatile solid-state memory device, or other types of memory systems, which maintain data (e.g., large amounts of data) even after power is removed from the system (i.e., non-volatile). While FIG. 1 shows that Storage Device 114 is a local device coupled directly to the rest of the components in the data processing system, embodiments may utilize a non-volatile memory which is remote from the system, such as a network storage device which is coupled to the data processing system through Network Interface 110, which may be a wired or wireless networking interface. Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
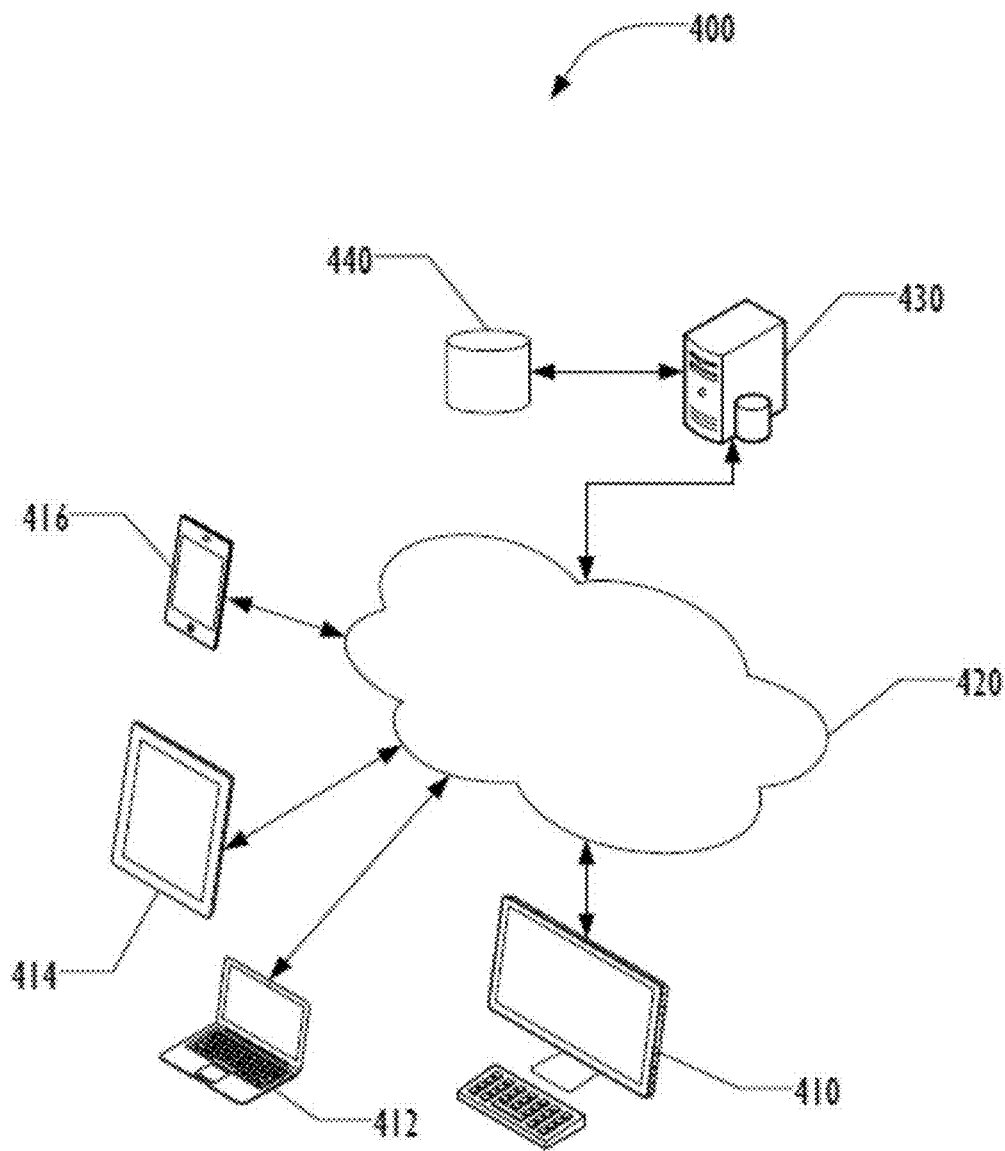
FIG. 2 is a block diagram illustrating a network environment that may be associated with one or more embodiments of the disclosed subject matter.

Turning now to FIG. 2, a block diagram illustrates a network of interconnected Programmable Devices 200, including Server 230 and an associated Datastore 240, as well as Desktop Computer System 210, Laptop Computer System 212, Tablet Computer System 214, and Mobile Phone 216. Any of these programmable devices may be the developer system or the target system shown as Computing Device 100 of FIG. 1. Network 220 that interconnects the programmable devices may be any type of network, wired or wireless, local or wide area, public or private, using any desired network communication protocols for transport of data from one system to the other. Although illustrated as a single Network 220, any number of interconnected networks may be used to connect the various programmable devices, and each may employ a different network technology.

In one example, Desktop Workstation 210 may be a developer system, distributing a graphic application to Server 230, which in turn may distribute the graphic application to multiple devices 212, 214, and 216, each of which may employ a different GPU as well as other different components. Upon launch of the graphic application, one action performed by the application can be creation of a collection of pipeline objects that may include state information, fragment shaders, and vertex shaders.

As noted above, embodiments of the subject matter disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs and GPUs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer, exemplified by O/S services 350. O/S services may provide core O/S functions in a protected environment. In addition, O/S services shown in layer 385 may include frameworks for OPENGL 351, Metal 352, Software Raytracer 353, and a Pure Software Rasterizer 354 (OPENGL is a registered trademark of Silicon Graphic, Inc.). These particular examples all relate to graphic and/or graphic libraries and are chosen to illuminate the topic of many embodiments herein, which relate to graphic handling. These particular examples also represent graphic frameworks/libraries that may operate in the lower tier of frameworks, such that developers may use shading and graphic primitives and/or obtain fairly tightly coupled control over the graphic hardware. In addition, the particular examples named in layer 385 may pass their work product on directly to hardware or hardware drivers, which is software typically tightly coupled to the hardware.

Referring again to FIG. 3, OpenGL 351 represents an example of a well-known library and application programming interface (API) for graphic rendering including 2D and 3D graphic. Metal 352 also represents a published graphic library and framework, but it is lower level than OpenGL 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphic information such as pixels without specialized graphic hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art.

Above the O/S services layer 385 is an Application Services layer 380, which includes SpriteKit 361, Scene Kit 362 Core Animation 363, and Core Graphic 364. The O/S services layer represents higher-level frameworks that are commonly directly accessed by application programs. In some embodiments of this disclosure the O/S services layer may include graphic-related frameworks that are high level in that they are agnostic to the underlying graphic libraries (such as those discussed with respect to layer 385). In such embodiments, these higher-level graphic frameworks are meant to provide developer access to graphic functionality in a more user- and developer-friendly way and to allow developers to avoid work with shading and graphic primitives. By way of example, SpriteKit 361 is a graphic rendering and animation infrastructure made available by Apple Inc. SpriteKit 361 may be used to animate two-dimensional (2D) textured images, or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphic rendering and animation infrastructure made available from Apple Inc. Core Animation 363 may be used to animate views and other visual elements of an application. Core Graphic 364 is a two-dimensional drawing engine from Apple Inc. Core Graphic 365 provides 2D rendering for applications.

Figure 3:
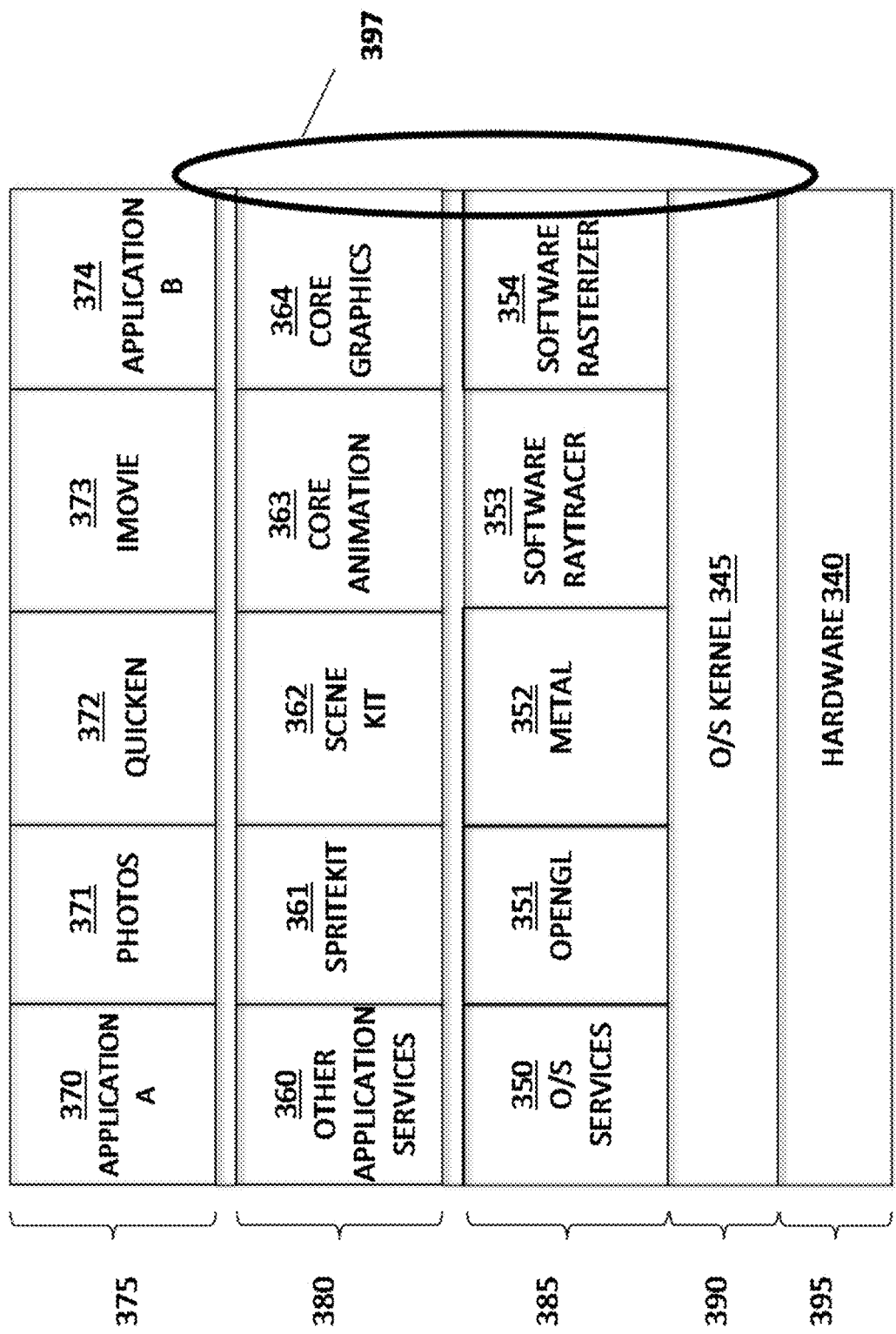
FIG. 3 is a block diagram showing an illustrative software architecture diagram according to one or more embodiments of the disclosed subject matter.

Above the application services layer 380, there is the application layer 375, which may comprise any number and type of application programs. By way of example, FIG. 3 shows three specific applications: photos 371 (a photo management, editing, and sharing program), QUICKEN 372 (a financial management program), and iMovie 373 (a movie making and sharing program) (QUICKEN is a registered trademark of Intuit, Inc.). Application layer 375 also shows two generic applications 370 and 374, which represent the presence of any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 340 and application 375 layers, shown by 397.

With reference again to FIG. 3, some embodiments may suggest the use of higher-level frameworks, such as those shown in application services layer 380. The high-level frameworks may perform intelligent analysis on particular graphic requests from application programs. The high level framework may then choose a specific hardware and/or a specific library or low-level framework to help process the request. In these embodiments, the intelligent analysis may provide for on-the-fly decision making regarding the best path for the graphic request to follow down to hardware.

Figure 4:
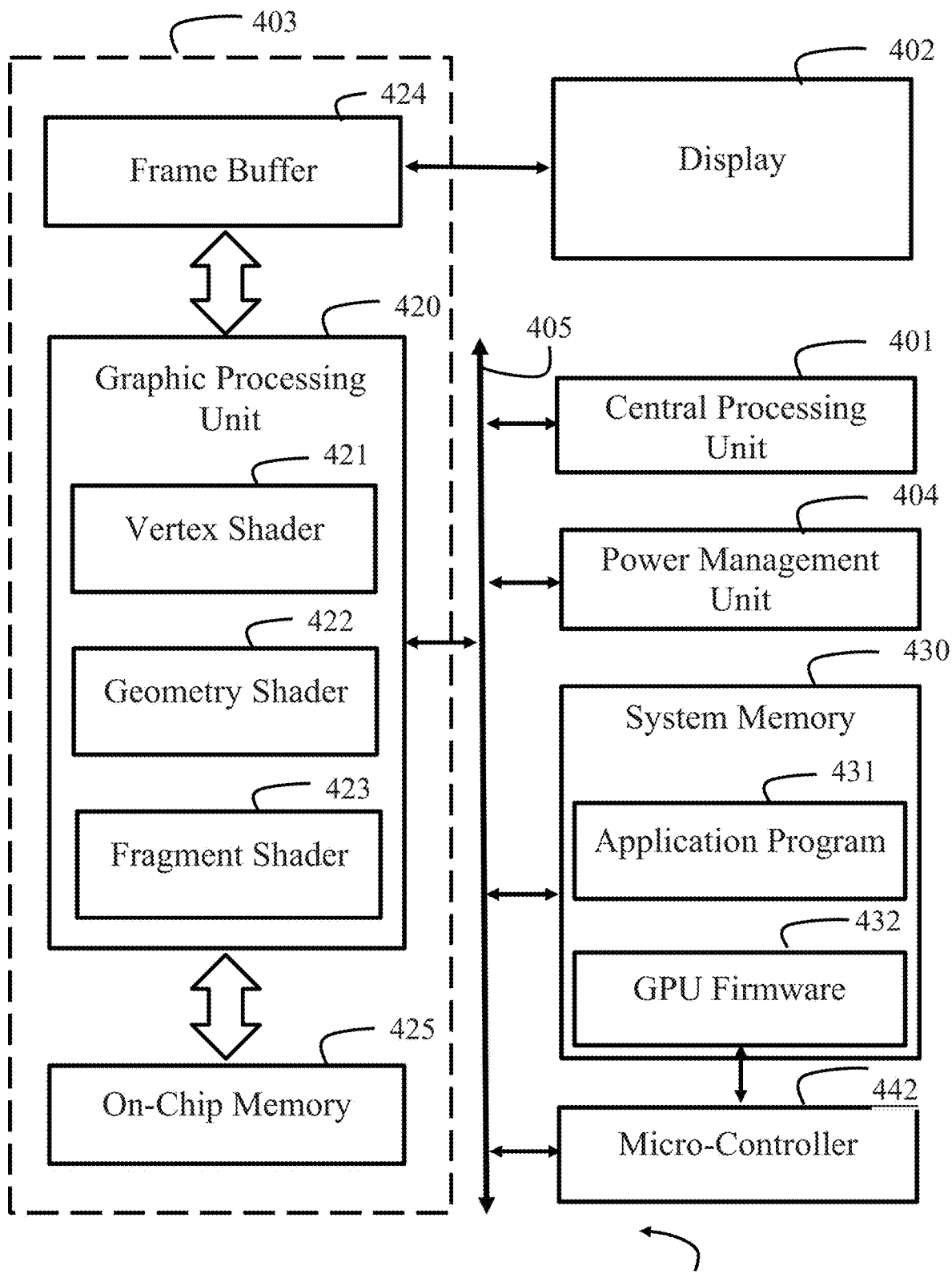
FIG. 4 is block diagram illustrating a computer system for implementing one or more aspects of the disclosed subject matter according to an embodiment of the disclosure.

Referring now to FIG. 4, a block diagram of Computing System 400 illustrates a computer system according to one embodiment. Computing System 400 includes CPU 401, Graphic Processing System 403, Display 402, Power Management Unit (PMU) 404, and System Memory 430. In the embodiment illustrated in FIG. 4, CPU 401 and Graphic Processing System 403 are included on separate integrated circuits (ICs) or packages. In other embodiments, however, CPU 401 and Graphic Processing System 403, or the collective functionality thereof, may be included in a single IC or package.

Data Bus 405 interconnects different elements of the Computing System 400 including CPU 401, System Memory 430, and Graphic Processing System 403. Data Bus 405 may be comprised of one or more switches or continuous (as shown) or discontinuous communication links. In an embodiment, System Memory 430 includes instructions that cause CPU 401 and/or Graphic Processing System 403 to perform the functions ascribed to them in this disclosure. More specifically, Graphic Processing System 403 can receive instructions transmitted by CPU 401 and processes the instructions to render and display graphic images on Display 402.

System Memory 430 may include Application Program 431 and GPU firmware 432. GPU firmware 432 is a software controlling the GPU execution of the graphics commands received from the CPU 401. The GPU firmware 432 may run on the Micro-Controller 442. In an embodiment, the Micro-Controller 442 is an integrated circuit comprising a processor core, input/output interface to communicate with Data Bus 405, memory, and embedded software (i.e., GPU firmware 432). The GPU Firmware 432 may be stored on non-volatile memory of the Micro-Controller 442 or it could be stored on the System Memory 430 as shown.

In an embodiment, Frame Buffer 424 is also located on System Memory 430. In another embodiment, Application Program 431 includes code written using an application programming interface (API). APIs can include a predetermined, standardized set of commands that are executed by associated hardware. Application Program 431 generates API commands to render an image by one or more shading engines of GPU 420 for display. GPU Driver 432 translates the high-level shading programs into machine code shading programs that are configured for each of the shading engines, e.g., Vertex Shader 421, Geometry Shader 422, and Fragment Shader 423.

Graphic Processing System 403 includes GPU 420, On-Chip Memory 425 and Frame Buffer 424. In one embodiment, CPU 401 transmits API commands to GPU 420 to render graphic data and store rendered images in Frame Buffer 424 to be displayed on Display 402. In an embodiment, a frame of graphic data is divided into multiple tiles. Each tile may be rendered to On-chip Memory 425 space by GPU 420. Upon completion of all tiles of a frame, Frame Buffer 424 may output the image to Display 402.

GPU 420 can include a plurality of cores or functional elements that are configured to execute a large number of threads in parallel. In an embodiment, at least some of the cores are configured as a shading engine that includes one or more programmable shaders. Each shader engine executes a machine code shading program to perform image rendering operations. In an embodiment according to FIG. 4, the shader engines can be Vertex Shader 421, Geometry Shader 422, and Fragment Shader 423. In an embodiment, Vertex Shader 421 handles the processing of individual vertices and vertex attribute data. Unlike Vertex Shader 421 that operates on a single vertex, the input received by Geometry Shader 422 are the vertices for a full primitive, e.g., two vertices for lines, three vertices for triangles, or single vertex for point. Fragment Shader 423 processes a fragment generated by rasterization into a set of colors and a single depth value.

PMU 404 is responsible of distributing power among different components of Computing System 400. Powering-up GPU 420 is part of an initialization operation to prepare GPU 420 for execution of the graphics command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve the most energy. In one embodiment, when no workload is assigned to GPU 420 for execution or when GPU 420 is waiting idle for the next workload, PMU 404 may place GPU 420 in sleep mode and provide minimal power to the unit.

Figure 5:
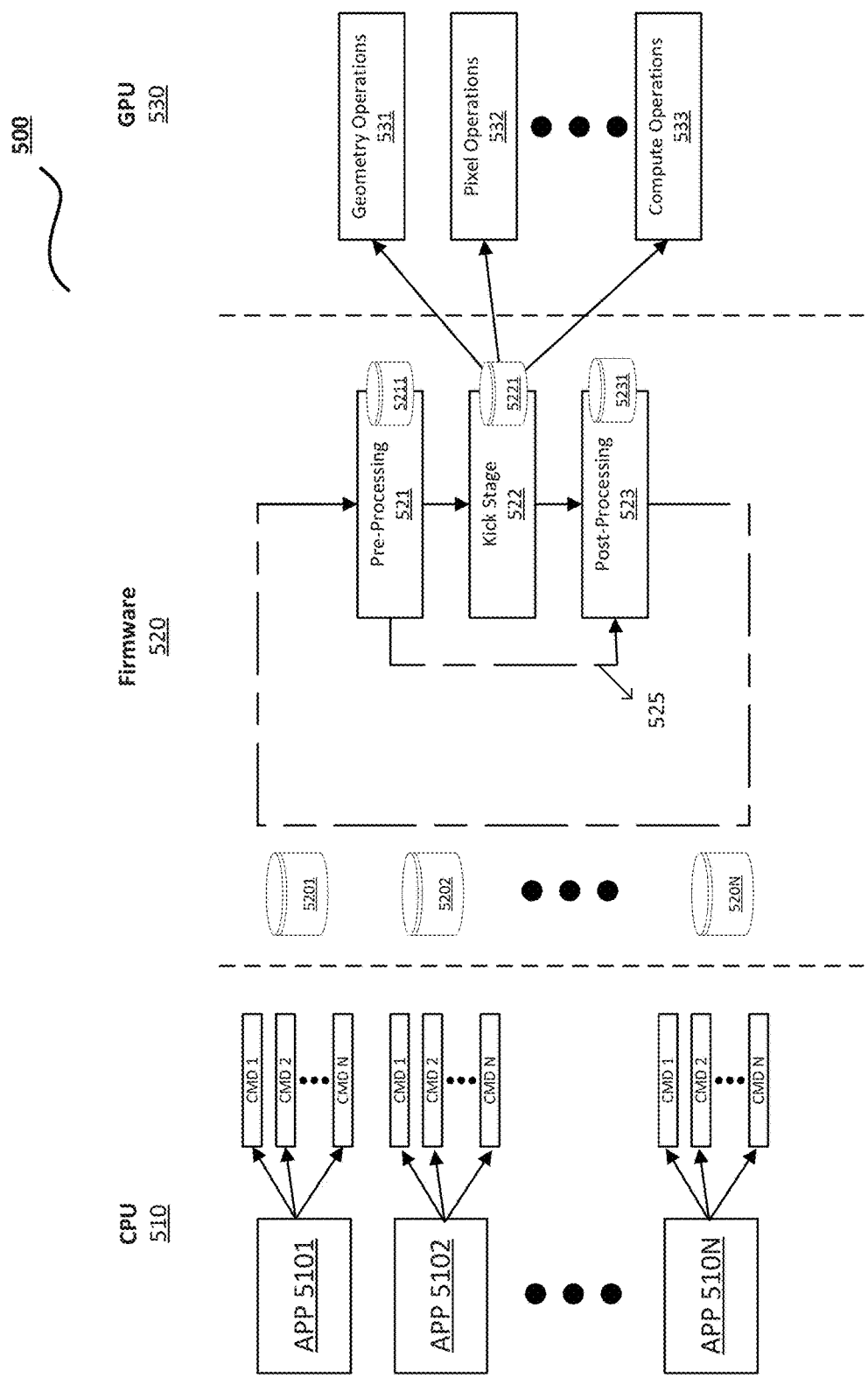
FIG. 5 is a block diagram illustrating the interaction between a CPU, GPU Firmware, and a GPU according to one embodiment of the disclosure.

Referring to FIG. 5, a block diagram 500 illustrates the interaction between the CPU 510, the Firmware 520, and the GPU 530 according to one embodiment of the disclosure. As discussed above, the CPU and GPU are two separate and asynchronous processors. In an embodiment, the CPU 510 encodes commands and the GPU 520 executes the encoded commands. The Firmware 520 controls the execution of the graphics commands received from the CPU 510 on the GPU 530. The Firmware 520 may comprise instructions stored in a non-volatile memory and executed by a separate microcontroller as previously discussed with reference to FIG. 4. Alternatively, the Firmware 520 could be a custom-designed hardware microcontroller. It is the goal of the Firmware 520 to process and schedule the graphics commands (received from the CPU 510) for execution such that the idle time of the GPU 530 is minimized.

In an embodiment, the CPU 510 may be running a plurality of applications 5101-510N. Each of the plurality of applications, for example Application 5101, may generate a plurality of commands (e.g., CMD 1-CMD N). In one embodiment, the CPU 510 may issue instructions and make calls to libraries, APIs, and graphics subsystems to translate the high-level graphics instructions to graphics code (i.e., shader code) executable by the GPU 520. The generated commands are stored in the priority Command Queues 5201-520N and communicated to the Firmware 520. In general, each application may have a set of priority ordered command queues.

The Firmware 520 may obtain the graphics commands from the Command Queues 5201-520N and divide each command to one or more micro-operations. In one embodiment, a micro-operation simplifies complex instructions into a single operation command (also referred to herein as "micro-command"). For example, in the Firmware 520, there may be micro-commands associated with Pre-Processing Stage 521, Kick Stage 522, and Post-Processing Stage 523. Actions associated with the Pre-Processing Stage 521 and Post-Processing Stage 523 may be performed by a low priority thread of the Firmware 520 (the loop 525 shown by the dashed lines). The low priority thread is responsible for operations before and after a command is submitted for execution on the GPU 520. For example, the low priority thread may be responsible for allocation of memory space, providing resources, scheduling, and calling appropriate instructions. High priority thread can be responsible for submitting commands to the GPU 520 for execution and receiving notification from the GPU when the GPU completes processing the command. For example, upon receiving an interrupt from the GPU 520, the high priority thread may submit the graphics commands that are processed and ready for execution to the appropriate GPU hardware.

In another embodiment, every command may be parsed in to a plurality of micro-commands that are processed in the three stages of Pre-Processing 521, Kick 522, and Post-Processing 523. In one embodiment, different queues are designated to store results from different stages of the processing pipeline (e.g., a First Queue 5211 for Pre-Processing stage 521, a Second Queue 5221 for Kick stage 522 and a Third Queue 5231 for Post-Processing stage 523). In some embodiments, one or more micro-commands may depend on each other. A dependency means that the data generated by a first micro-command may be needed for processing a second micro-command. As such, the GPU 530 may not be able to start execution of a particular micro-command until its perquisite micro-commands are completely processed.

By way of example, the GPU 530 may be performing different operations such as Geometry Operation 531, Pixel Operations 532, and Compute Operations 533. In an embodiment, the execution of a pixel command depends upon data generated from a geometry command. For example, the geometry commands can generate a list of primitives that are then processed by the pixel commands. More specifically, for submission of a pixel command to the GPU at the Kick Stage 522, the geometry command, which the pixel command depends on, must first be completely processed. Therefore, the pre-processing and kick stages of the geometry command must first be completed before the pre-processing and kick operations associated with the pixel command may be performed. Finally, at Kick stage 522, the micro-commands associated with this stage is processed and stored in the Second Queue 5221 to be selected during the next GPU interrupt for execution. Therefore, a command may remain in Kick Stage 522 until all micro-commands that it depends on are processed. In the meantime, the GPU (e.g., hardware for Pixel Operations) may be sitting idle until the dependencies are satisfied.

Figure 6:
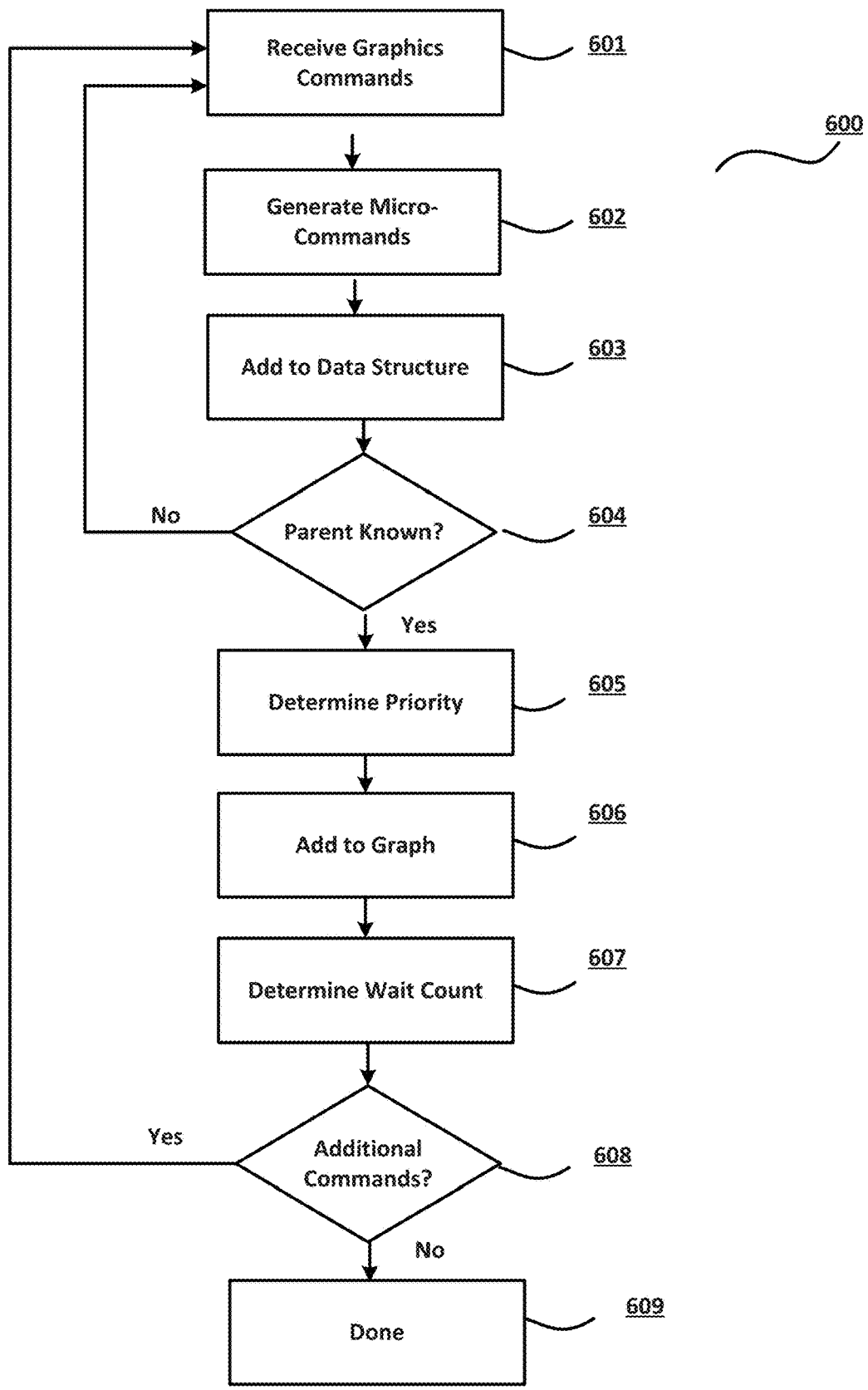
FIG. 6 is a flowchart illustrating an example operation by which dependencies between commands are determined and organized according to an embodiment of the disclosure.

Any two commands executing on the GPU could share a texture or surface. As such, a dependency relationship may exist between the two commands such that a first command (i.e. the producer) writes to the surface and a second command (the consumer) reads the writes to the surface. Therefore, the dependency between the two commands requires the execution of the write commands before the execution of the read commands. It is important to provide a method of identifying dependencies between the micro-commands such that the idle time of the GPU 530 is reduced. Conventionally, when a first micro-command is stored in the Second Queue 5221 at Kick Stage 522, the low priority thread goes through every micro-command stored in the First Queue 5211 to identify and process the micro-commands that the first command depends upon. Alternatively, when a micro-command completes at Kick Stage 522 (i.e. because the GPU 530 finished operating on it), it will mark the completion by updating a memory location with an incrementing value. All micro-commands in the Pre-Processing stage 521 with a dependency on another micro-command need to test if it was their Producer micro-command that completed. Such an approach fails to provide a short search period with a predictable turnaround time. The method described in this disclosure improves the conventional technique of identifying and processing dependent micro-commands in order to reduce the idle time of the GPU 530. Referring to FIG. 6, the flowchart 600 illustrates an operation by which dependencies in graphics processing can be determined and organized in an execution graph according to one or more embodiments of the disclosure. At block 601, the graphics commands processed by the CPU 510 is transmitted to the GPU Firmware 520. The graphics commands could be stored and communicated through command queues. In an embodiment, each command queue may include a plurality of commands. At block 602, each command may be parsed into a plurality of micro-commands. As explained previously, the dependencies in graphics processing may be described at both the command and micro-command levels. One skilled in the art could use the disclosed technique of graphics processing in both contexts. However, for the sake of simplicity, the embodiments disclosed herein are described in the context of micro-commands, but can be used interchangeably.

Figure 7:
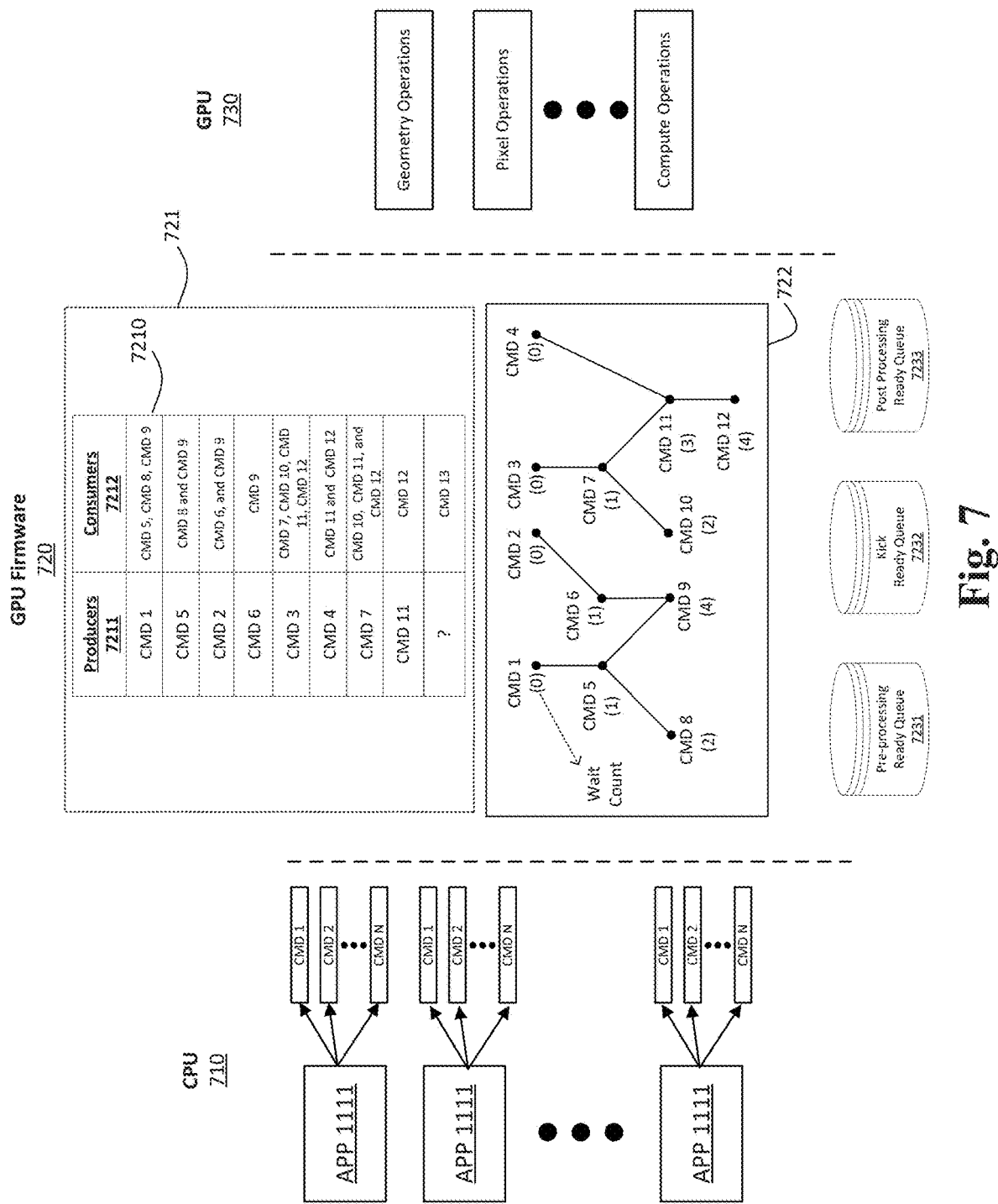
FIG. 7 is a block diagram illustrating the interaction between a CPU, GPU Firmware, and a GPU according to another embodiment of the disclosure
Figure 8:
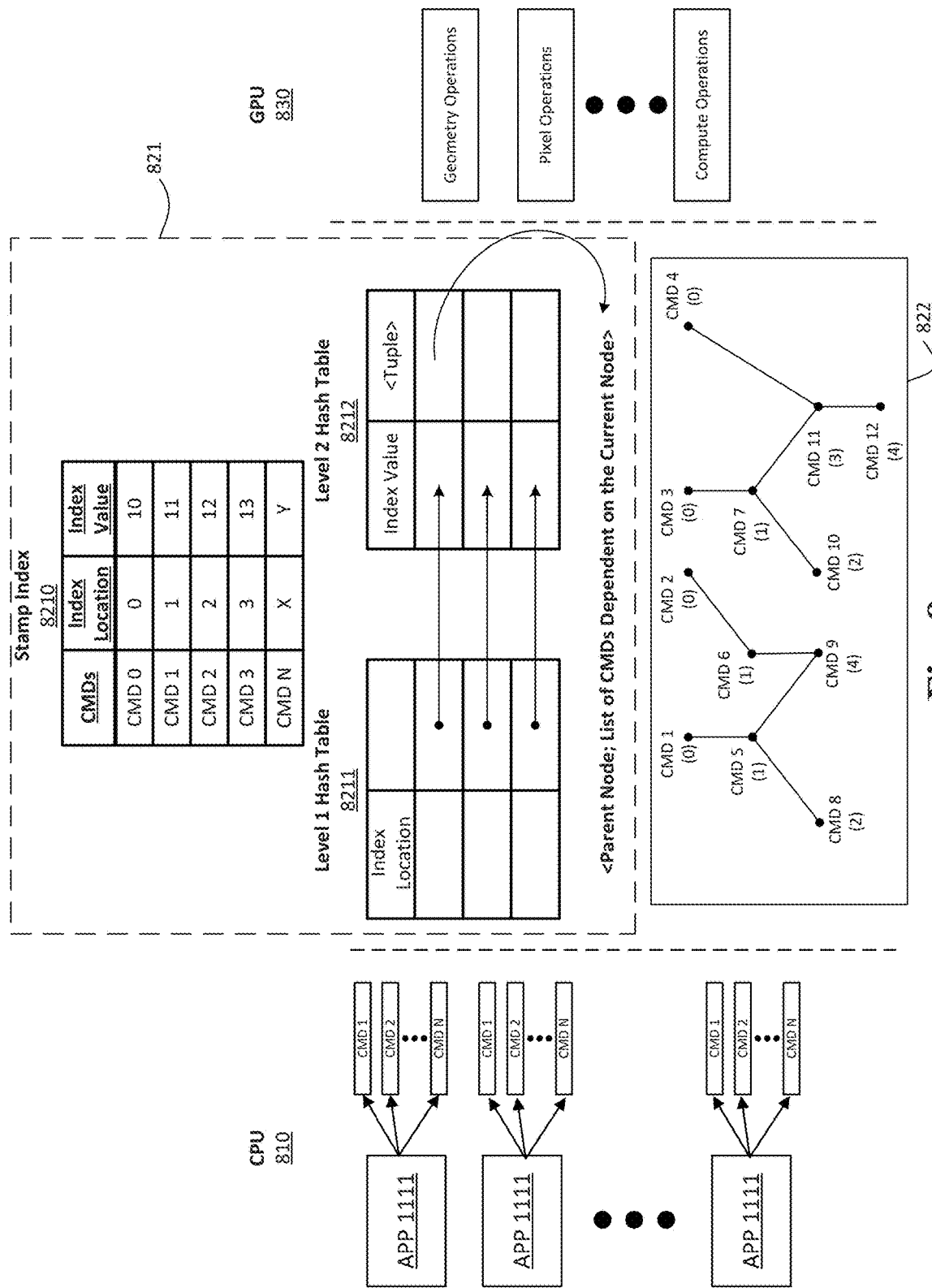
FIG. 8 is a block diagram illustrating the operation of a holding station according to one embodiment of the disclosure.

At block 603, the graphics commands are received by the holding station of the firmware, for example, the Holding Station 721 of the GPU Firmware 720 in FIG. 7. In one embodiment, the Holding Station 721 may include a Data Structure 7210 to register and track the graphics commands received from the CPU 710. In one or more embodiments, the Data Structure 7210 includes data regarding the dependency of the received graphics commands, including the micro-commands generated from the graphics commands. The Data Structure 7210 may include data regarding Producers 7211 and Consumers 7212. Producers 7211 include parent micro-commands that generate data required for processing by Consumers 7212 (i.e., child micro-commands). For example, in the Data Structure 7210, CMD 5, CMD 8, and CMD 9 depend on CMD 1. Therefore, the data generated by CMD 1 is necessary for execution of the CMD 5, CMD 8, and CMD 9. In one instance, a parent command may be a geometry commands and child command may be a pixel command. In another instance, a micro-command in a Kick stage or Post-Processing stage may depend on a micro-command from the pre-processing stage. Returning to FIG. 6, at block 603 as a command is received from the CPU 710 and converted to its associated micro-commands, it is determined whether the command's dependencies are known. For example, referring to the Data Structure 7210, CMD 5 is dependent on CMD 1. Therefore, the CMD 5's dependencies are known. On the other hand, the Data Structure 7210 does not have information regarding the actual micro-commands that the micro-command CMD 13 depends on. In this case, the parent command(s) for CMD 13 may have not been transmitted from the CPU 710 yet. However, in one embodiment, upon receiving CMD 13, the GPU Firmware 720 has enough information about the number of parent command(s) that CMD 13 depends on even though the parent commands are not known yet. This information may be used to determine the number of parent-child edges needed to be formed for CMD 13 prior to adding the command to the graph. When dependencies of a received command are known, the operation proceeds to block 605, otherwise, the operation proceeds back to block 601 in order to start an analysis of another command. At block 605, the priority of the selected micro-command is determined. In one embodiment, the priority of the micro-commands may be setup at command queue construction time. For example, each Command Queue 5201, 5201 to 520N may have a priority associated with it. The priority may be an immutable value that is the same for all the commands/micro-commands within a command queue. At block 605, this priority is passed down. In an embodiment, each micro-command may be first categorized into one of a plurality of priority groups. Then, the system may enforced a desired priority based on a priority policy. For example, if micro-commands are categorized in two categories of zero and one, a priority policy may prioritize all category zero commands over the category one commands. The priority policy may be updated dynamically at any time based on the processing conditions of the system.

At block 605, the selected micro-command is added to an execution graph. Referring again to FIG. 7, in one embodiment, the Execution Graph 722 may be a Directed Acyclic Graph with each node representing a command (or a micro-command) and each edge representing a dependency between the two connected nodes. The Execution Graph 722 is a Directed Acyclic Graph (DAG) because the decencies between the nodes are drawn in a top-down unidirectional fashion.

In an embodiment, to be added to the Execution Graph 722, the node representing a particular command must be connected with an edge to a parent node. The parent node may have been added to the Execution Graph 722 in prior rounds or it could be added to the graph at the same time as the child node. When the dependency of a micro-command is known, both the child micro-command and the parent micro-command that it depends on must be included in the graph.

For example, when CMD 5 is received, the data structure 7210 indicates it depends on CMD 1. Therefore, both nodes are added to the graph such that a first node (CMD 1) is connected by an edge to a second node (CMD 5). Now, when CMD 8 is received it may be added to the graph because its parent, CMD 5, already exists in the graph. On the other hand, the dependencies for CMD 13 is not yet known. For example, the commands from which the CMD 13 depends upon may have not been processed by the CPU 710 yet. As such, at block 604, the operation proceeds to the next command until the dependencies for CMD 13 are determined.

Each micro-command has a wait count which is essentially how many parent micro-commands it has to wait for before executing. A block diagram 800 illustrates operation of the Holding Station 821 according to one embodiment of the disclosure. The Holding Station 821 prepares the stream of commands received from the CPU 810 for placement within the Execution Graph 822. As discussed above, the CPU 810 may communicate the commands to the GPU 830 through one or more command queues. The processing of the commands in one or more queues are tracked by the Stamp Index 8210. In an embodiment, there may be multiple Stamp Indexes, each associated with a separate command queue. Every time a command or a micro-command completes processing, the Stamp Index 8210 is updated. For example, when CMD 0 is processed, at the index location 0 an index value of 10 is registered. The index value is predetermined. Therefore, the index value may be used to address dependencies. For example, dependency of CMD 1 on CMD 0 may be addressed by conditioning the processing of CMD 1 on when 10 is written in the index location 0 (indicating completion of CMD 0).

Figure 9:
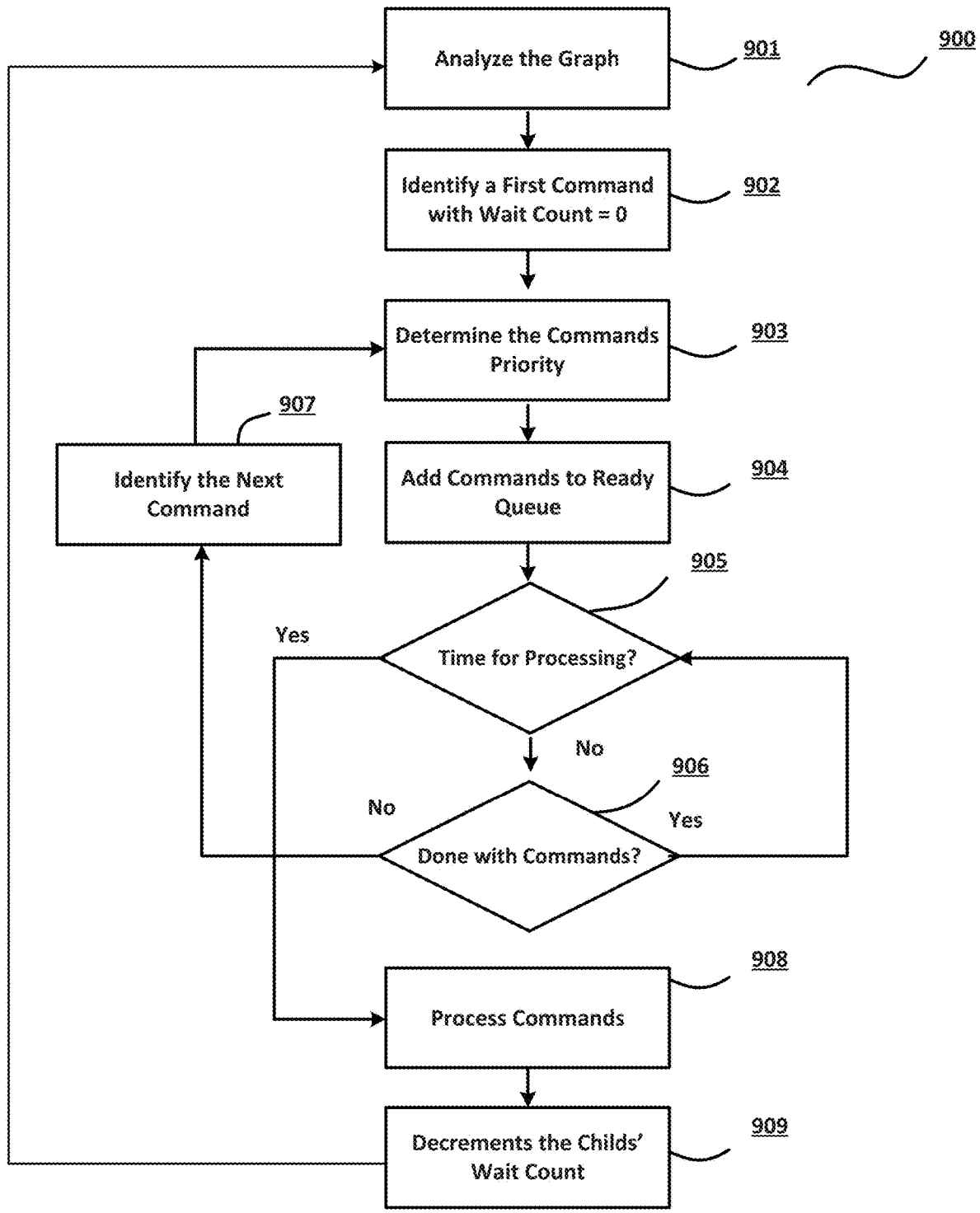
FIG. 9 is a flowchart illustrating an example operation by which the execution graph is used for scheduling commands for processing according to an embodiment of the disclosure.

In an embodiment, the Holding Station 821 may also include two Hash Tables 8211 and 8212. These Hash Tables are used to identify the dependencies between the received commands, and subsequently, facilitate generation of the Execution Graph 822. In one embodiment, the key for Level 1 Hash Table 8211 is an Index Location. For a given Index Location, the Level 1 Hash Table 8211 points to a Level 2 Hash Table 8212, which is storing the Index Value corresponding to that Index Location. Therefore, the key to the Level 2 Hash Table 8212 is an Index Value. Finally, for a given Index Value, the Level 2 Hash Table turns in a tuple. The tuple includes the name of the parent command producing the associated index values (i.e., producer) and the list of all commands (i.e., consumers) that depend on the generated Index Value. Therefore, using the data obtained from the Holding Station 821, the Execution Table 822 is generated as discussed above with reference to FIG. 6. Referring to FIG. 9, the flowchart 900 illustrates an operation by which the execution graph is used for scheduling commands according to one or more embodiments of the disclosure. The creation of the execution graph, as explained with reference to FIG. 6, and scheduling of the commands based on the execution graph, as explained with referenced to FIG. 9, may occur in parallel at runtime.

At block 901, the execution graph is analyzed to determine an efficient order for scheduling of the incoming commands. The execution graph may include one or more parent nodes connected to their dependent zero or more child nodes. The analysis of the execution graph may provide priority and/or dependency information for each command. Using the execution graph, the commands are scheduled for processing such that the time the GPU remains idle waiting for prerequisite commands is minimized.

At block 904, the selected micro-command is added to a ready queue. The micro-commands stored in the ready queue are prepared for scheduling. The ready queue is a priority queue, therefore, the priority information obtained at block 903 is used to determine a proper sequence to store the micro-commands within the queues. Referring to FIG. 7, there may be a plurality of priority queues to store commands with a wait count of zero. For example, the Pre-processing Ready Queue 7231 is used to store pre-processing micro-commands with a wait count of zero, the Kick Ready Queue 7232 is used to store kick micro-commands with a wait count of zero, and the Post-Processing Ready Queue 7233 is used to store post-processing micro-commands with a wait count of zero.

At block 905, the operation determines whether it is time to process the micro-commands stored in the ready queues. Note that the flowchart 900 represents the flow of events, not a flow of time. Therefore, in an embodiment the time to process the commands may occur earlier or later in the flowchart. For example, when the system is done processing the previous commands it may become available to process additional commands, and therefore, trigger block 905. In another example, an occurrence of a GPU interrupt may define the frequency by which the micro-commands are transmitted to the GPU for execution.

If it is the time for processing the micro-commands, the operation proceeds to block 908. In one embodiment, the high priority thread checks the Kick Ready Queue 7232 to process the micro-commands and submit them to the GPU 730 for execution. Since all commands in the ready queues have a wait count of zero, the GPU 730 does not need to wait for processing any prerequisite micro-command and therefore can proceed with execution of the micro-commands transmitted at the Kick stage.

On the other hand, the low priority thread processes the micro-commands stored in the Pre-processing Ready Queue 7231 and Post-Processing Ready Queue 7233. The priority policy may dictate which ready queue is prioritized. For example, a pre-processing micro-command may be prioritized because a micro-command at the kick stage is dependent on it (as would be evident in the DAG 722).

At block 909, the wait count for the children nodes of the micro-command that was processed at block 908 is decremented. In an embodiment, at block 908 an indication is received that the processing at block 908 is completed. In response to the indication, all children nodes of the processed micro-command is decrement by a single unit and the processed micro-command is removed from the execution graph. For example, referring to the Execution Graph 722 of FIG. 7, when CMD 1 is processed at block 909, the wait counts of CMD 5, CMD 8, and CMD 9 are decremented. As such, after processing CMD 1, the micro-command CMD 5 will have a wait count of zero, CMD 8 will have a wait count of 1, and CMD 9 will have a wait count of 3. In this scenario, when the operation 900 loops back from block 909 to block 901, the micro-command CMD 5 will be identified at block 902 for having a wait count of zero.

At block 905, if it is not the time for processing of the micro-commands, the operation proceeds to block 906. At block 906, the operation 900 determines whether there are additional micro-commands with zero wait count. If there are additional micro-commands, at block 907 the next command is identified after which the operation 900 proceeds back to block 903 to determine the command's priority.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A method of low-latency graphics processing, comprising:
   obtaining, from a central processing unit (CPU), a plurality of graphics commands;
   generating, based on the plurality of graphics commands, a plurality of micro-commands including pre-processing micro-commands to retrieve data, kick micro-commands to process the retrieved data, and post-processing micro-commands to store processed data;
   determining dependencies between the plurality of micro-commands and using a data structure to maintain a registry of the plurality of micro-commands and the determined dependencies;
   creating an execution graph separate from the data structure based on the determined dependencies in the data structure, wherein each micro-command in the execution graph is represented as a node and wherein dependencies in the execution graph are represented as edges between related micro-commands;
   defining a wait count for each micro-command within the execution graph, wherein the wait count for a particular micro-command is a number of micro-commands that the particular micro-command depends on; and
   transmitting one or more micro-commands with the wait count of zero to a ready queue for processing.

2. The method of claim 1, wherein determining comprises:
   registering the plurality of micro-commands in a data structure, wherein the data structure tracks the dependency between the plurality of micro-commands.

3. The method of claim 2, wherein the data structure comprises a first hash table having an entry for each micro-command stored in the execution graph, each entry including a tuple identifying all of the micro-commands that depend on the entry's corresponding micro-command.

4. The method of claim 1, further comprising:
   determining, for the plurality of micro-commands, one or more priority categories, wherein each of the micro-commands of the plurality of micro-commands is associated with one of the one or more priority categories.

5. The method of claim 4, further comprising:
   receiving a priority policy to define priorities of the one or more priority categories, wherein the execution graph is further created based on the priority policy.

6. The method of claim 1, further comprising:
   updating the wait count for a first group of micro-commands within the execution graph after completion of processing of one or more transmitted micro-command that the first group of micro-commands depend upon.

7. The method of claim 1, wherein the execution graph comprises a directed acyclic graph.

8. The method of claim 1,
   wherein the pre-processing micro-commands are associated with a pre-processing stage,
   wherein the kick micro-commands are associated with a kick stage,
   wherein the post-processing micro-commands are associated with a post-processing stage, and
   wherein the kick stage has a different execution priority relative to the pre-processing stage and the post-processing stage.

9. A method of low-latency graphics processing, comprising:
   analyzing an execution graph comprising a plurality of micro-commands, wherein the execution graph is generated from a data structure registry of micro-commands and related dependencies separate from the execution graph, wherein the plurality of micro-commands include pre-processing micro-commands to retrieve data, kick micro-commands to process the retrieved data, and post-processing micro-commands to store the processed data, wherein the execution graph includes nodes that represent each micro-command and edges that represent dependencies between respective micro-commands;
   identifying, based on the analysis, at least one micro-command for processing;
   storing the at least one micro-command in a ready queue for processing;
   receiving a first signal indicative that the at least one micro-command has completed processing;
   determining, in response to the first signal, one or more other micro-commands in the execution graph that are dependent on the at least one micro-command; and
   updating each identified dependent micro-command to reflect the at least one micro-command has finished processing.

10. The method of claim 9, wherein identifying further comprises:
    selecting at least one micro-command having a wait count of zero, wherein the wait count represents a number of micro-commands the at least one micro-command depends on.

11. The method of claim 10, wherein updating comprises:
    decrementing the wait count of each identified dependent command.

12. The method of claim 9, wherein storing comprises:
    storing the at least one micro-command in one of a pre-processing queue, a kick queue, and a post-processing queue.

13. The method of claim 9, wherein the execution graph comprises a directed acyclic graph.

14. The method of claim 9, further comprising determining a priority of the at least one micro-command.

15. The method of claim 14, further comprising selecting a first micro-command from the ready queue for processing based on a priority of the first micro-command.

16. The method of claim 9,
    wherein the pre-processing micro-commands are associated with a pre-processing stage,
    wherein the kick micro-commands are associated with a kick stage, wherein the post-processing micro-commands are associated with a post-processing stage, and wherein the kick stage has a different execution priority relative to the pre-processing stage and the post-processing stage.

17. A non-transitory computer readable medium comprising instructions stored thereon to support graphics processing; the instructions when executed cause one or more processors to:

obtain, from a central processing unit (CPU), a plurality of graphics commands;

generate, based on the plurality of graphics commands, a plurality of micro-commands including pre-processing micro-commands to retrieve data, kick micro-commands to process the retrieved data, and post-processing micro-commands to store the processed data;

determining dependencies between the plurality of micro-commands and using a data structure to maintain a registry of the plurality of micro-commands and the determined dependencies;

creating an execution graph separate from the data structure based on the determined dependencies in the data structure, wherein each micro-command in the execution graph is represented as a node and wherein dependencies in the execution graph are represented as edges between related micro-commands;

define a wait count for each micro-command within the execution graph, wherein the wait count for a particular micro-command is a number of micro-commands that the particular micro-command depends on; and transmit one or more micro-commands with the wait count of zero to a ready queue for processing.

18. The non-transitory computer readable medium of claim 17, wherein the instructions to cause the one or more processors to determine, further comprises instructions to cause one or more processor to:

register the plurality of micro-commands in a data structure, wherein the data structure tracks the dependency between the plurality of micro-commands.

19. The non-transitory computer readable medium of claim 18, wherein the data structure comprises a first hash table having an entry for each micro-command stored in the execution graph, each entry including a tuple identifying all of the micro-commands that depend on the entry's corresponding micro-command.

20. The non-transitory computer readable medium of claim 17, further comprises instructions to cause the one or more processors to:

determine, for the plurality of micro-commands, one or more priority categories, wherein each of the micro-commands of the plurality of micro-commands is associated with one of the one or more priority categories.

21. The non-transitory computer readable medium of claim 20, further comprises instructions to cause the one or more processors to:

receive a priority policy to define priorities of the one or more priority categories, wherein the execution graph is further created based on the priority policy.

22. The non-transitory computer readable medium of claim 17, further comprises instructions to cause the one or more processors to:

update the wait count for a first group of micro-commands within the execution graph after completion of processing of one or more transmitted micro-commands that the first group of micro-commands depend upon.

23. The non-transitory computer readable medium of claim 17, wherein the pre-processing micro-commands are associated with a pre-processing stage, wherein the kick micro-commands are associated with a kick stage, wherein the post-processing micro-commands are associated with a post-processing stage, and wherein the kick stage has a different execution priority relative to the pre-processing stage and the post-processing stage.

* * * * *